US007377504B2

(12) United States Patent
Houldsworth

(10) Patent No.: US 7,377,504 B2
(45) Date of Patent: May 27, 2008

(54) SUPPORT/ASSEMBLY STRUCTURE AND ARTICLE RETAINING ARRANGEMENTS

(75) Inventor: Mik Houldsworth, Lincolnshire (GB)

(73) Assignee: Framex Concepts, Limited, Lincolnshire (GB)

( * ) Notice: Subject to any disclaimer, the term of this patent is extended or adjusted under 35 U.S.C. 154(b) by 89 days.

(21) Appl. No.: 10/547,979

(22) PCT Filed: Mar. 3, 2004

(86) PCT No.: PCT/GB2004/000895

§ 371 (c)(1),
(2), (4) Date: Jun. 9, 2006

(87) PCT Pub. No.: WO2004/078422

PCT Pub. Date: Sep. 16, 2004

(65) Prior Publication Data

US 2006/0249637 A1 Nov. 9, 2006

(30) Foreign Application Priority Data

Mar. 6, 2003 (GB) ................................ 0305098.6

(51) Int. Cl.
*B23Q 3/00* (2006.01)
*F16M 11/24* (2006.01)

(52) U.S. Cl. .......................... 269/296; 269/95; 269/45; 248/166; 248/440.1

(58) Field of Classification Search ................ 269/296, 269/45, 43, 166, 243, 138, 95; 248/166, 248/440.1, 165
See application file for complete search history.

(56) References Cited

U.S. PATENT DOCUMENTS 5,372,218 A 12/1994 Kesler
5,662,315 A * 9/1997 Neiss et al. .................... 269/17
2006/0226311 A1* 10/2006 Radermacher .............. 248/166
2006/0249637 A1* 11/2006 Houldsworth ............... 248/166
2006/0249643 A1* 11/2006 Weng ......................... 248/424

FOREIGN PATENT DOCUMENTS

GB 2348621 11/2000
GB 2376914 12/2002

* cited by examiner

*Primary Examiner*—Lee D Wilson
(74) *Attorney, Agent, or Firm*—Brinks Hofer Gilson & Lione

(57) ABSTRACT

A foldable work piece support assembly (10) incorporating at least one rapid locking and quick release of article retaining means (26) for enabling rapid locking and quick release of articles required to be supported by the foldable support assembly/structure (1) the rapid locking and quick release article retaining means (26), including first and second clamp members (87, 79) providing first and second operationally co-operable clamping surfaces (81, 84) an elongate thrust member (60) supporting the second clamp member (79) for axial movement in a predetermined direction relative to the first clamp member (67) to enable variation of the separation between the clamping faces along said axial direction, a manually operable unidirectional drive means (89) for producing relative movement between the first and second clamp members (87, 79) to produce a required relative clamping, displacement between the first and second clamp members, means (95, 97, 98) for preventing movement of the thrust means (60) the reverse sense to said one sense said means being adapted for selective operation so as to allow relative movement of the members in the reverse sense.

18 Claims, 10 Drawing Sheets

SUPPORT/ASSEMBLY STRUCTURE AND ARTICLE RETAINING ARRANGEMENTS

This invention relates to support/assembly structures for facilitating the erection and provision of support for working surfaces such as work benches, extended area article supports and for work pieces and in particular to provide temporary support for articles.

This invention further relates to the provision of rapid locking and quick release article retaining means for use separately or in conjunction with support/assembly structures for facilitating the erection and provision of support for working surfaces such as work benches, extended area article supports and for work pieces and in particular to provide temporary support for articles.

In particular, the present invention is concerned with the provision of support structures/assemblies that are adjustable between a working position and a stored or folded position.

Adjustable work table constructions are known and in may cases have found great favour with work persons and for the so called 'do it your self' market and activities.

OBJECTS OF THE INVENTION

It is an object of the present invention to provide a support structure/assembly in which the handling of a work piece with respect to the structure/assembly is facilitated.

It is a further object of the present invention to provide a framework which is adjustable between a non-use setting and a operational setting in which it can provide support for a work piece and/or work surface arrangement and which at least reduces some of the difficulties which have been met in the use of known foldable supports that have been found not readily to lend themselves to the support of relative large area articles such as, for example, a household door, a standard sheet of plywood, plaster board or other relatively large sized articles that are frequently required to be worked upon at a location at which articles are used/installed The consequential operational problems arising from the use of known support systems stem from the very nature of such articles to be supported and the required positioning upon the support structure for the purposes of working thereupon. In practice the positioning of such articles upon a support surface often involves man handling of an article that may well be heavy and awkward to handle in relation to an erected foldable support structure in that such handling may well involving supporting the article with one hand whilst operating with the other hand means for securing the article in a required place on the support.

A further object of the invention is to provide article retaining/clamping arrangements for facilitating the handling of work pieces.

It is a particular further object of the present invention to provide a portable framework which is not only capable of application as above indicated but which is additionally readily stowable, for example, in the boot of a motor car.

STATEMENTS OF INVENTION

According to a first aspect of the invention there is provided a foldable work piece support assembly/structure incorporating at least one rapid locking and quick release of article retaining means for enabling rapid locking and quick release of articles required to be supported by the foldable support assembly/structure.

Preferably, the foldable framework/structure comprises two similar pivotally interconnected frames each incorporating two leg members maintained in pre-selectable spaced relationships by at least one connecting member, and wherein a rapid locking and quick release article retaining means is mounted from a said leg member of at least one of the frames.

In a preferred construction the the frames comprise by upper and lower connecting members that are settable to a cruciform position for the purposes of use and foldable to lie one against the other for the purposes of stowage and transportation and that are lengthways adjustable to permit length adjustment of the framework/structure according to the size and/or shape/form of a article to be supported.

Conveniently, the connecting members each comprise at least two elements telescopically engageable one with the other, the arrangement being such as to provided for different working dimensions for the support assembly.

In accordance with a second aspect of the invention there is provided a rapid locking and quick release article retaining means, includes first and second clamp members providing first and second operationally co-operable clamping surfaces, an elongate thrust member supporting the second clamp member for axial movement in a predetermined direction relative to the first clamp member to enable variation of the separation between the clamping faces along said axial direction, a manually operable unidirectional drive means for producing relative movement between the first and second clamp members to produce a required relative clamping displacement between the first and second clamp members, means for preventing movement of the thrust means in the reverse sense to said one sense said means being adapted for selective operation so as to allow relative movement of the members in the reverse sense.

Preferably, the second member is provided at one end of an elongate support element whose longitudinal axis defines said direction, and wherein the first member engages with the elongate support intermediate of the ends thereof in such manner as to allow relative displacement between the first member and the elongate support.

In a preferred construction of the rapid locking and quick release article retaining means the first and second members are engageable with the elongate support means in such manner that the clamping surfaces face towards each other or such that the clamping surfaces face away from each other.

Conveniently, the first and second clamp members and their support are relatively rotatable.

Conveniently the second member is provided at one end of an elongate support element whose longitudinal axis defines said direction, and wherein the first member engages with the elongate support intermediate of the ends thereof in such manner as to allow relative displacement between the first member and the elongate support.

Preferably, first and second members are engageable with the elongate support means in such manner that the clamping surfaces face towards each other or such that the clamping surfaces face away from each other.

A further aspect of the invention provides a rapid locking and quick release article retaining means that is adapted for attachment to a hollow support in such manner that the length of the elongate element exposed defines a clamping range of relative displacement of the first and second members, and in which the elongate support means can be positionally displaced lengths ways of the first member to allow variation of said range upon operation of the manually operable means.

In accordance with a further aspect of the invention the rapid locking and quick release article retaining means includes additional means for enabling the retaining means to serve as a sash cramp.

In accordance with an additional aspect of the invention there is provided a support structure/assembly that is adjustable between a working position and a stored or folded position with least one article retaining means for enabling rapid locking and quick release of articles required to be supported by the foldable support assembly/structure.

Preferably the article retaining means includes means for clamping and/or cramping the article with respect to the framework/structure including relatively movable clamp/cramping jaws or the like that are positionally settable with respect to the remainder of the support structure in such manner that clamping/cramping is effectable at selective levels with respect to the remainder of the support structure.

Preferably, the frames comprise by upper and lower connecting members that are settable to a cruciform position for the purposes of use and foldable to lie one against the other for the purposes of stowage and transportation and that are lengthways adjustable to permit length adjustment of the framework/structure according to the size and/or shape/form of a article to be supported.

Conveniently, the connecting members each comprise at least two elements telescopically engageable one with the other, the arrangement being such as to provided for different working dimensions for the support assembly.

In accordance with a still further aspect of the invention the leg members of a foldable support framework/assembly are adapted to mount article retaining means for enabling rapid locking and quick release of articles required to be supported by the foldable support assembly/structure in such manner that the article retaining means are positionally adjustable with respect to the associated leg member.

In accordance with a further aspect of the invention there is provided at least one an additional leg forming member that is adapted for readily removable attachment to the remainder of the assembly in such manner as to be positionally adjustable relative to the remainder of the framework/assembly.

Conveniently such an article retaining means is mounted to an additional leg member that is so attachable to the framework/structure as to be capable of positional displacement with respect thereto, the arrangement being such that the associated article clamping/cramping means can be moved to an appropriate location of the article required to be supported by the support framework/structure.

Preferably, means are provided for enabling the frames to be lockable into selected angular settings one relative to the other.

In a preferred construction the construction of the main frames is such that the framework/structure can not only be used when the leg members are vertical but also when the leg members are horizontal the arrangement being such that the framework/structure is operationally settable to a first working position for horizontal support of work pieces and or worktable/surface and a second working position for non-horizontal positioning and support of work pieces, and wherein the article retaining means are operative what ever the orientation of the framework/structure.

BRIEF DESCRIPTION OF THE DRAWINGS

For a better understanding of the invention and to show how to carry the same into effect reference will now be made to the accompanying drawings in which:—

DETAILED DESCRIPTION OF THE DRAWINGS

Figure 1:
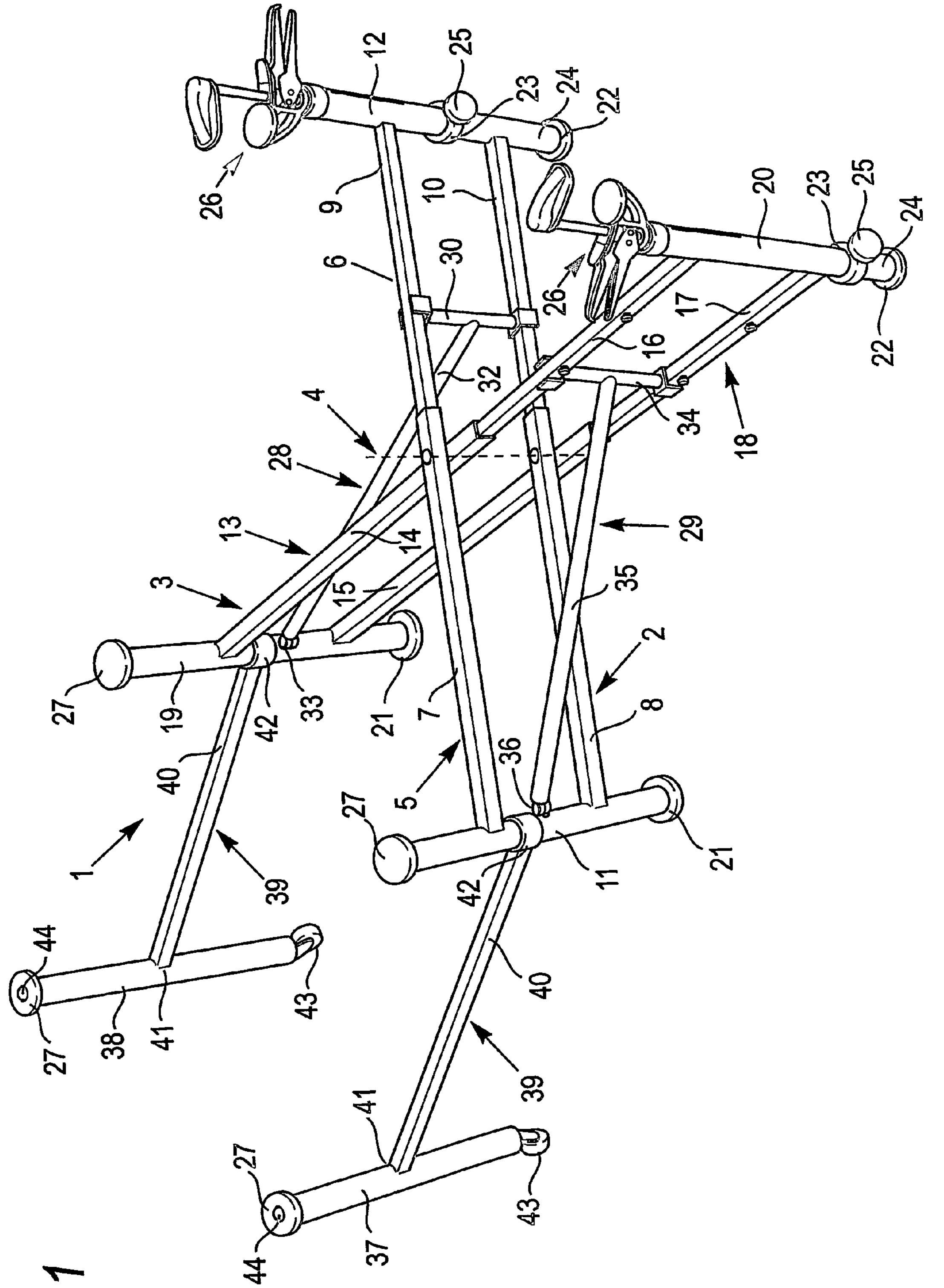
FIG. 1 is a perspective view of the work surface support assembly/structure of the invention, the Figure showing the support in a first orientation when in an erected setting.

Referring now to FIG. 1 this Figure illustrates a work surface support assembly 1 as comprising a pair of main frames 2 and 3 so constructed as to be foldable close together and openable by relative pivotal movement about a centrally located pivot axis 4 into the position as shown in FIG. 1 when the assembly is required to support a work piece or work surface (not shown in FIG. 1).

As will be noted from FIG. 1 the main frame 2 essentially comprises a rectangular framework comprising first and second sections 5 and 6, with the first section 5 including an upper rail 7 and a lower rail 8, and the second section 6 including upper and lower rails 9 and 10 respectively telescopically engaging in the corresponding rails 7 and 8 of the first section 5. The rails 7 and 8 of the first section 5 connect with a support leg unit 11 and the rails 9 and 10 of the second section 6 connect with a second support leg unit 12.

The second main frame 3 is of a similar construction to that of the first main frame 2 and includes a first section 13 including upper and lower rails 14, 15 telescopically engaging with the corresponding upper and lower rails 16 and 17 of the associated second section 18. As in the case of the main frame frame 2 the upper and lower rails of the sections 13 and 18 connection with support leg units 19 and 20 respectively As will be noted from FIG. 1 the two main frames 2 and 3 are pivotally interconnected for pivotal movement about said axis 4 such that the upper members 7 and 8 of the first main frame 2 are positioned above the upper members 14,16 of the second main frame 3 and such that the lower members 8 and 10 of the first mentioned frame 2 are located below the lower members 15,16 of second frame 3.

In other words the main frames 2 and 3 are arranged in a cruciform manner so that they can be pivoted together for storage and transport requirements or can be relatively pivoted into a range of relative utilisation positions such as the position shown in FIG. 1 when the support assembly is required for supporting a work piece or work surface (not shown in FIG. 1).

The support legs units 11 and 19 each includes a positionally settable load spreading plate/foot 21 and the support legs 12 and 20 each include, a load spreading plate/foot 22 which are is screw threaded into the end region 24 of the associated leg whereby the support assembly can be height wise positionally adjusted so that any support surface mounted to the support frames can be accurately set into a horizontal plane and/or any unevenness of the ground can be eliminated. The undersides of the plates 21 and 22 can be provided with means (not shown) such as projecting tips or can be of a convex form which afford point like contact with the ground.

The legs 12 and 20 are provided with ring members 23 slidable lengthways of the legs and lockable in a required position by locking screws 25, I use of these ring members is discussed hereinafter.

At least one of the main support legs of each main frame i.e., the support legs 12 and 20 are each provided at the upper ends thereof with a rapid action work piece clamp unit 26. The Figures illustrate the provision of one such unit. Such clamp units will be described hereinafter The upper ends of the support leg units 11 and 19 are are provided with top pieces 27 which provide an extended area extending transverse to the axial direction of the associated main support leg 11, 19 for the support of a work piece (not shown). The upper surfaces of these top pieces 27 can be suitably covered with a material that is not likely to cause damage to a work piece placed thereupon.

When the support structure as so far described is in use the two main frames are required to be set at an angle relative to each other that is appropriate to the work piece to be supported. The main frames are maintained in the required angular relationship by locking elements 28 and 29. The element 28 includes a bar 30 bridging the upper and lower rails 9 and 10 of the associated telescoping section 6 and so connected therewith as to be relatively displaceable along the rails 9 and 10.

The bar 30 is connected intermediate the ends thereof to one end of a bar 32 whose other end is coupled to the support leg unit 19 by way of a pivot connection 33. The other locking element 29 includes a bar 34 bridging the upper and lower rails 16 and 17 of the associated telescoping section 18 and so connected therewith as to be relatively displaceable along these rails. The bar 34 is connected intermediate the ends thereof to a bar 35 whose other end is coupled to the support leg unit 11 by way of a pivot connection 36. Means not shown in the FIG. 1 are provided for locking the bars 30 and 34 against movement when the requisite angular separation of the frame units is achieved.

In order to extend the support capability of the support structure additional support leg units 37 and 38 are respectively attachable to the leg support units 19 and 11. These additional units 37 and 38 can be readily removably attachable to the associated leg support units 11 and 19 or may be permanently connected to the leg units 11 and 19 by attachment means 39 schematically illustrated in FIG. 1. Each attachment means 39 includes a bar 40 that is connected at one end 41 to the associated leg unit 37/38 and its other end 42 to the associated leg unit 11/19 in such manner that the associated leg unit 37/38 can be operationally positioned at any location around a part circle whose radius is defined by the length of the associated bar 39. With this arrangement the leg support units 35/36 can be regarded as outrigger support leg units To facilitate this positioning capability the lower end of each support leg unit 37 and 38 is provided with a castorable wheel 43, As will be seen from FIG. 1 the support leg units 37 and 39 are provided with top pieces 27 similar to those provided upon the support leg units 11 and 19.

It should be noted that the additional support leg units 37/38 can be positioned to lie against the main frames when the latter are folded into their side by side relationship. In a variation (only very schematically shown for one of the top pieces) the top pieces 27 for the leg units 11, 19, 37 and 38 can be provided with one or more roller bearings 44 to facilitate the movement of a work piece (not shown) being mounted to the support structure in a required position by a work person.

This variation is, in practice, particularly useful when it is required to displace a work piece supported upon the structure with respect to a tool that is maintained in a fixed position relative to the support structure.

Figure 2:
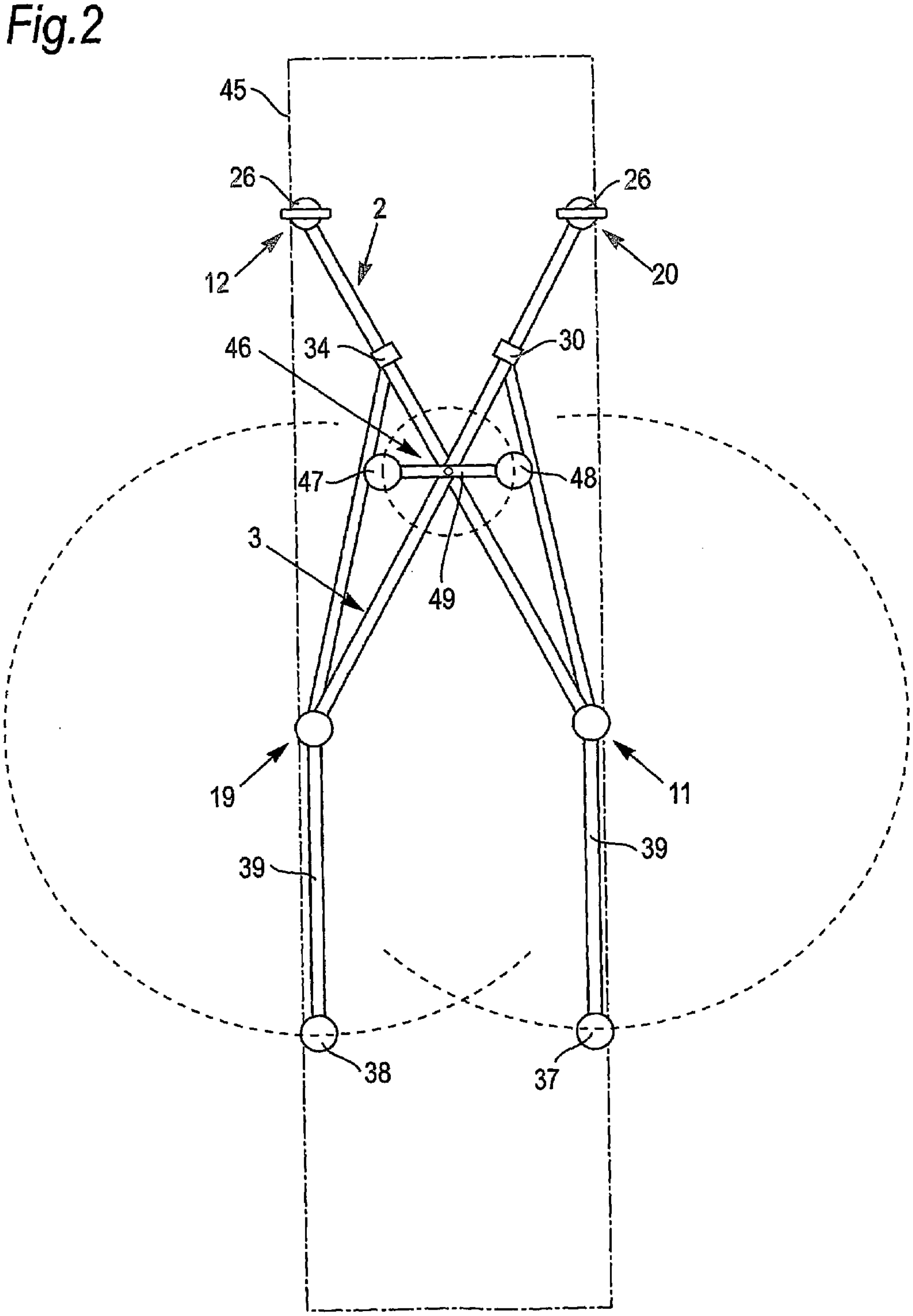
FIGS. 2, 3 and 4, each schematically illustrate a different operational setting for the support structure shown in FIG. 1.

Referring now to FIG. 2, this FIG. 2 can be regarded as an outline representation in plan view of a possible operational setting for the support structure of FIG. 1. The elements previously mentioned in relation to FIG. 1 are identified by similar reference numerals in FIG. 2. As will be noted the main frames 2 and 3 are set at required angle to each other, with the additional support units 37 and 38 effectively positioned as to form a square with the support leg units 11 and 19.

With the arrangement shown the FIG. 2 is shown in very schematic outline form a rectangular work piece 45 measuring 2.4 metres by 0.61 metres. It will be understood that work pieces are not restricted to rectangular shapes or to work pieces smaller/larger than the size mentioned. In practice, an important factor is that when mounted to the support structure the work piece support structure combination must be stable for reasons of work piece workability and safety.

If the support structure is required to support extra long work pieces additional outrigger support leg units (not shown) can be mounted from any convenient support leg unit. For example, to the legs 37/38 or to any of the other legs as thought convenient.

As so far described the construction of the support structure is such that a work piece needs to be able to bridge the leg units 11, 19, 12 and 20, thereby effectively setting a minimum size. In order to provide a support structure capable of mounting small work pieces FIG. 2 illustrates a centre central support unit 46 providing an additional pair of work piece support platforms 47 and 48 carried by a support bracket 49 adapted for mounting onto the frames 2 and 3 as indicated.

The structure of the mounting bracket 49 is such as to allow the centre pair of platforms 47 and 48 to be selectively positioned into various positions with respect to the other support tables and the clamping means.

Figure 3:
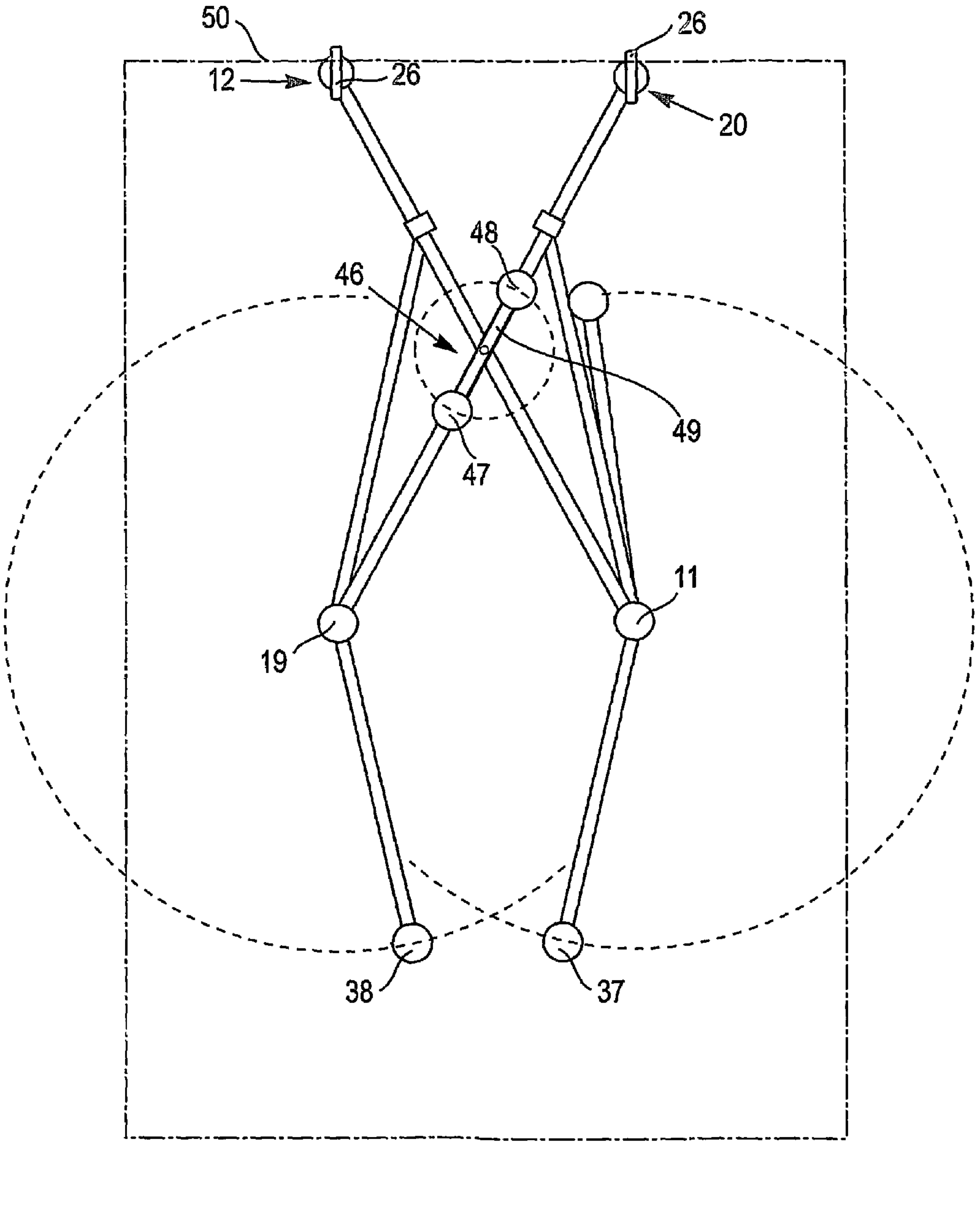
Figure 4:
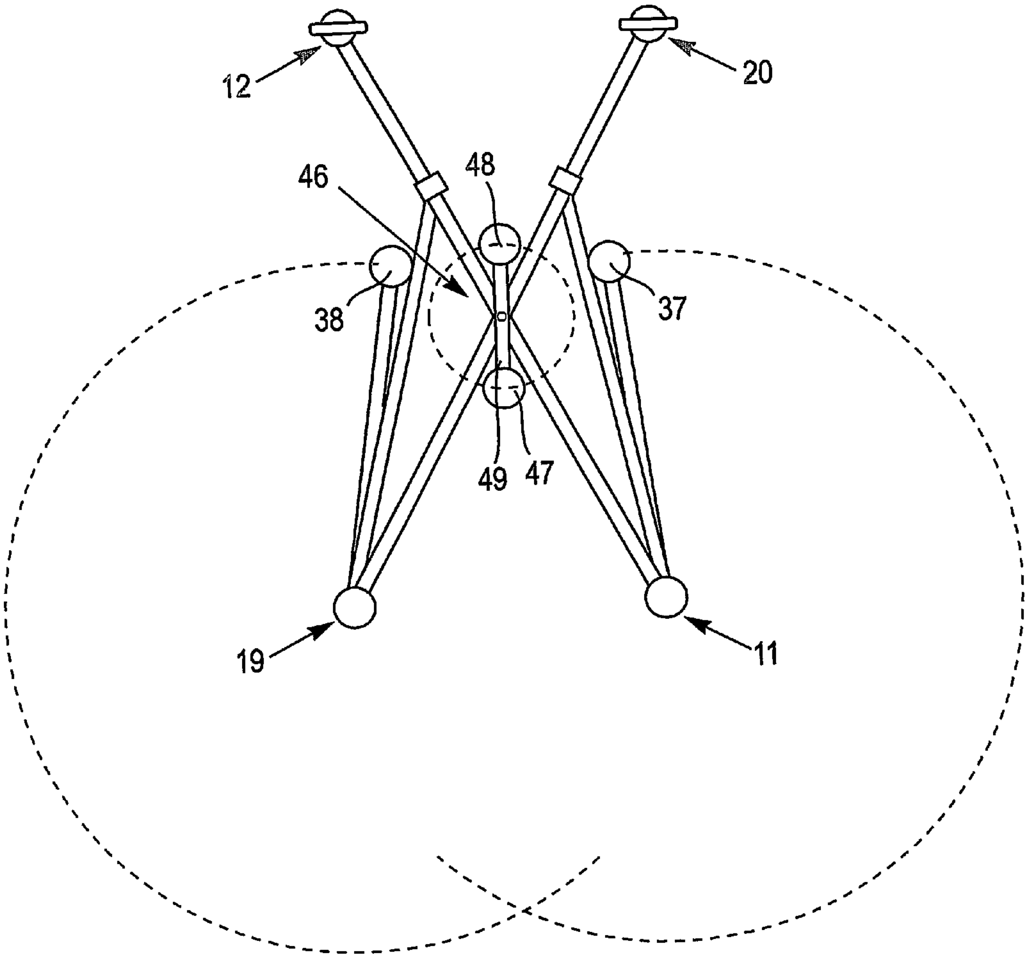

FIGS. 3 and 4 schematically illustrate alternative possible positions for the central platforms and the relative positions of the various support leg units.

The FIG. 3 configuration illustrates a useful feature of the support structure in relation to the dividing length ways of a work piece 50 comprising an elongate sheet of material for example, of dimensions 2 metres in width and some 4 metres in length. As will be noted from the FIG. 3 each half of the work piece 50 to either side of a lengthways central line is supported at four positions, This has the practical result that on dividing the work piece length ways the two separated parts of the work piece are fully supported throughout the separation process and at the completion thereof. In the Figure the work piece 50 is held in place by the clamp units 26.

In the configuration shown in FIG. 4 the leg support units 37 and 38 are shown in a position in which they lie within the area defined by the remaining support leg units 11, 12, 19 and 20. This position can be regarded as a stowed position for such units 37 and 38.

As an alternative form of the central support facility 49 the latter can incorporate additional work piece clamping means of similar construction to that mounted to the leg units 12 and 20.

It should be noted that the support structure can be used in an orientation in which the legs are horizontal. This arrangement enables the handling of work pieces that are arranged vertical.

Figure 5:
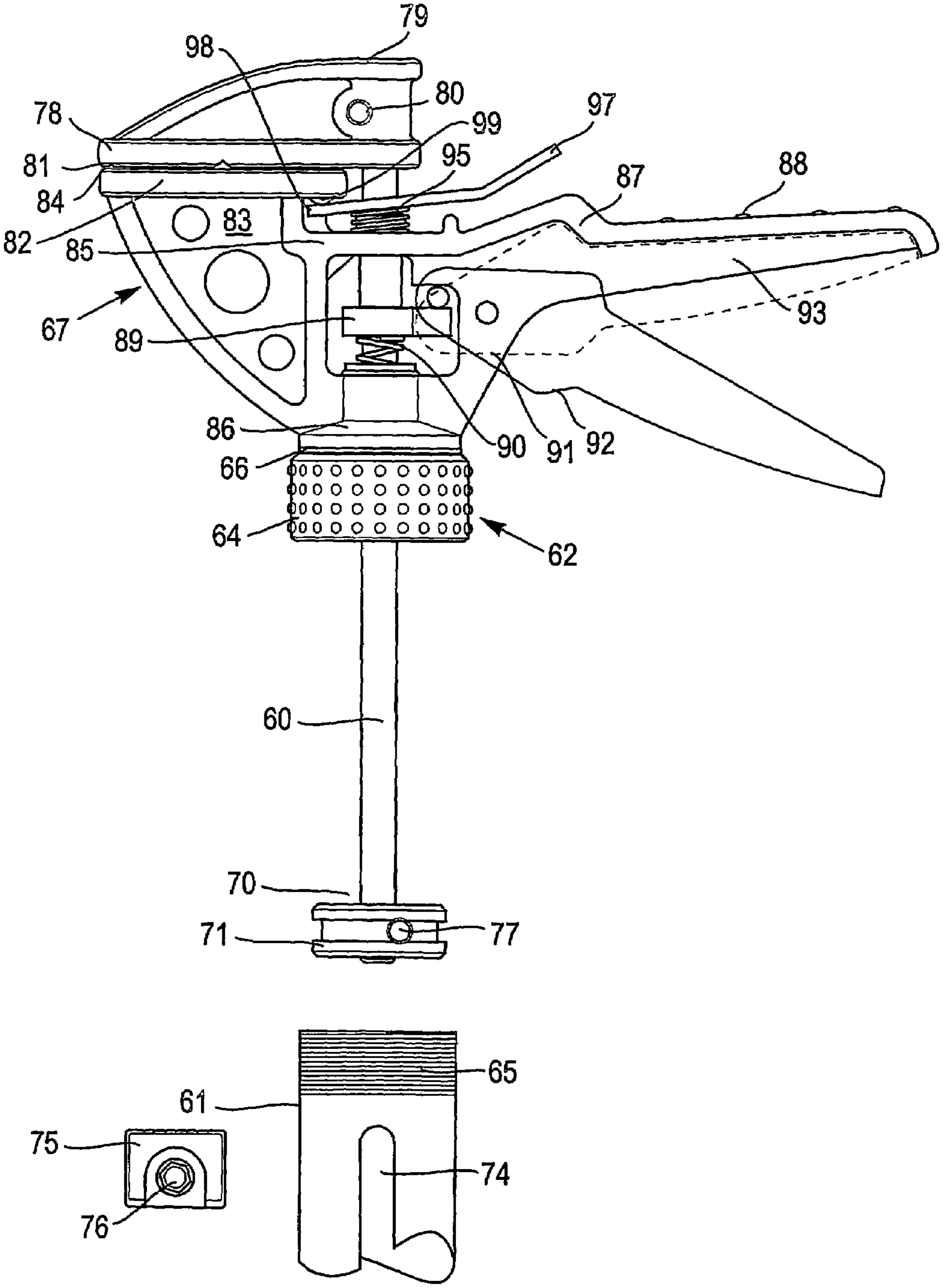
FIG. 5 is a part exploded view of a work piece clamping/cramping unit.
Figure 6:
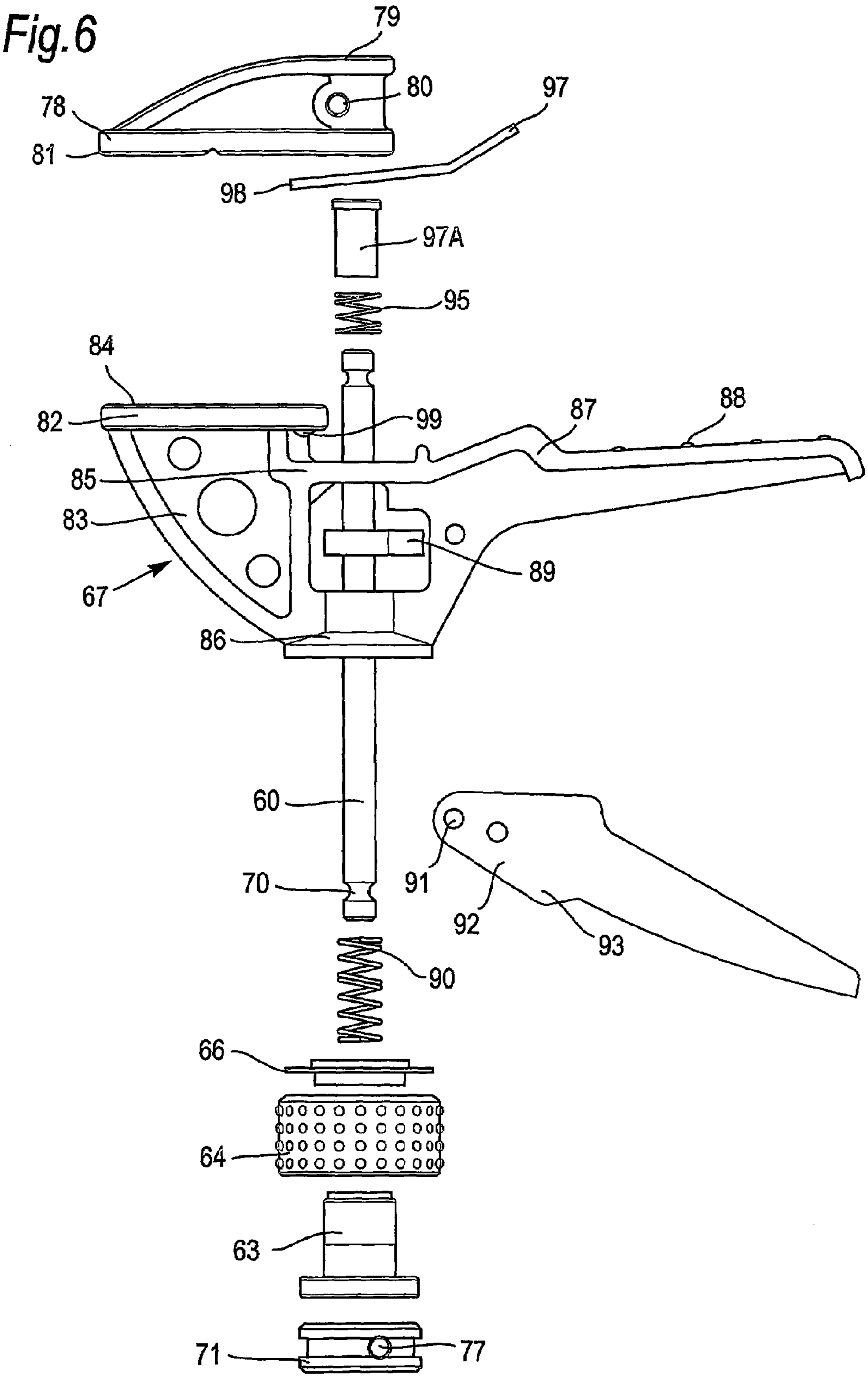
FIG. 6 is an exploded view of the various components forming the clamping/cramping unit of FIG. 5.

The rapid locking and quick release article retaining means/clamp unit 26 will now be considered in relation to FIGS. 5 and 6 in a form in which it is directly associated with a support leg of the above discussed support structure/assembly. The clamp assembly includes a main element in the form of a bar/tube/rod 60 that is telescopically received by the upper end of a tube 61 which for the purposes of the present Application is formed by the upper end of a support leg unit 12/20. The rod 60 is supported and guided at the upper end of the tube 61 by coupling unit 62 which includes an inner sleeve 63 (FIG. 3) that slidably and rotatably receives the rod 60 and which is connected with an outer annular member 64 having an internal thread that screws onto a complimentary thread 65 at the top of the tube. A spacer member 66 is provided between the coupling unit 62 and the main body 67 of the clamp unit 26

The lower end 70 of the rod 60 when within the 61 is axially lockable to the tube 61 by means of the combination of a thrust bearing 71 in such manner that the rod 60 can be axially displaced length ways of the tube and locked in any desired setting relative to the tube by means of a thrust block 75 and associated locking screw also engaging with the rod in such manner that the rod remains rotatable through 360 degrees with respect to the tube.

An elongate slot 74 is provided at the upper region of the tube. The thrust block 75 is shaped to conform to the curved outer surface of the tube 62 and as has been mentioned is connected to the bearing 71 by a screw 77 engaging the slot. The position of the rod 60, the thrust bearing and thrust block 75 length ways of the slot 74 is effectively set by the actuation of the lever 93.

A first work piece clamping plate 78 is carried by a bracket 79 adapted for mounting to the upper end of the rod 60 and is secured to the rod by a retaining screw 80. As shown the plate 78 provides a downwards facing clamping surface 81.

A second work piece contacting clamp plate 82 is carried by a second bracket 83 forming part of the main body structure 67. The bracket 83 projects outwardly sufficiently for both said plates 78 and 82 to be positioned in a face to face alignment. The plate 82 as shown in the Figure provides an upwardly facing clamping surface 84

The main body 67 incorporates upper and lower spaced apart webs 85 and 86 that are both apertured to enable the main body to displace axially of the rod 60 and thus the tube 61 to which the rod is mounted. The dimensioning of the upper and lower webs is such that the main body is constrained to a smooth displacement axially of the rod without wobble.

The main body includes a further integrally connected bracket 87 extending in a direction opposite to that of the bracket 83 carrying the second work piece clamping plate 82. This bracket 87 is shaped to provide a hand grip 88 that is positionally fixed relative to the main body.

An annular plate 89 serving as a catch plate is located between the upper and lower webs 85 and 86, the plate having an internal aperture that is axially off set with respect to the axis of the outer diameter of the plate and of such diameter as to allow the plate 89 to be tiltable with respect to the rod 60 and thus the main body 67 in a defined direction. A compression spring 90 is located beneath the plate 89 and the lower web 86, the spring acting in such manner when compressed it exerts upward force upon the plate.

The spring 90 is set to its compressed condition by a plate contacting bar 91 carried be the nose part 92 of a first order lever 93 pivotally mounted to the underside of the further bracket 87. This lever 93 has a rest position as shown in the dashed lines in FIG. 5.

Figure 7:
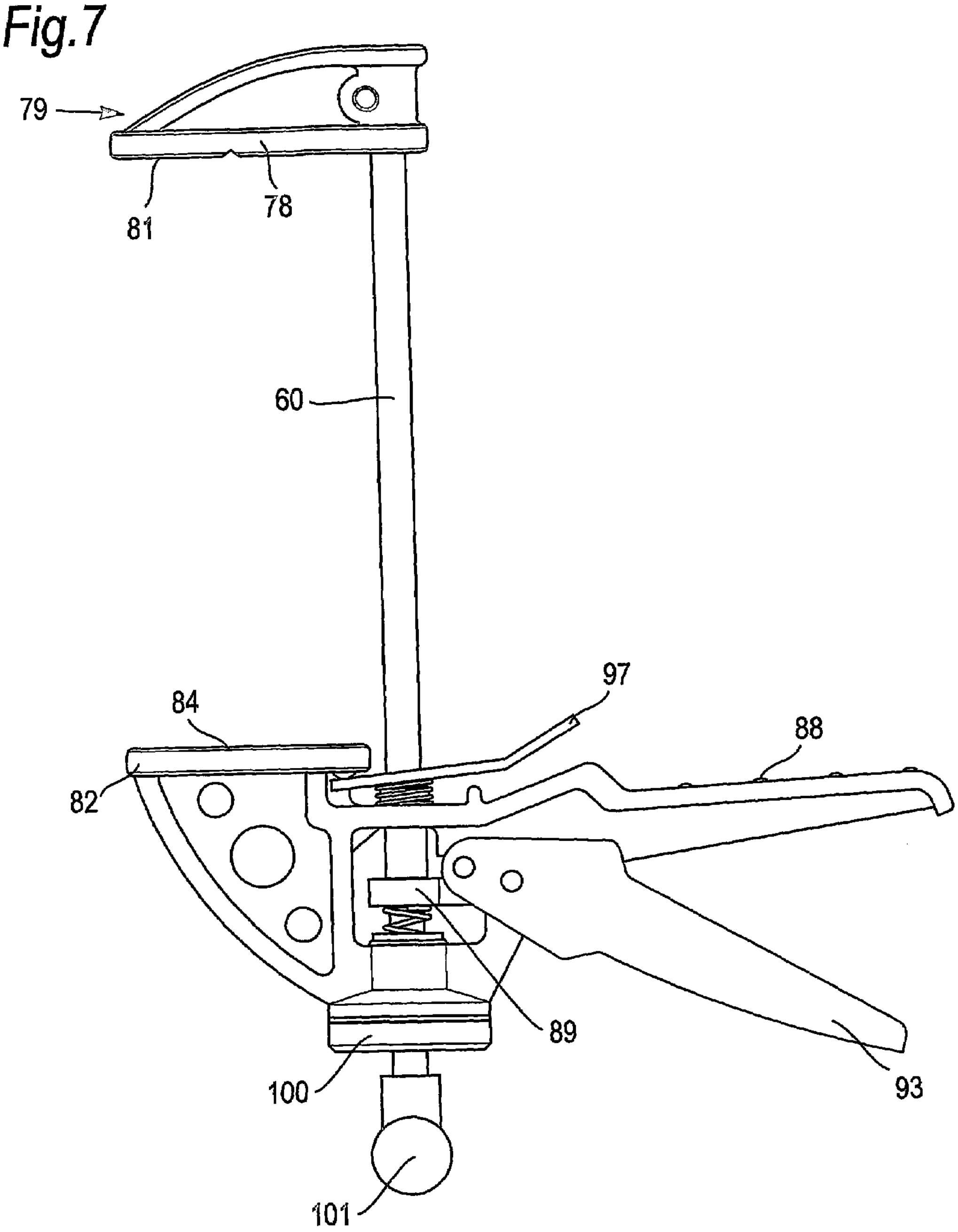
FIG. 7 schematically illustrates an embodiment a work piece clamping means that is usable independently of a support structure and which when in use the clamping jaws move towards each other to exercise a clamp.
Figure 8:
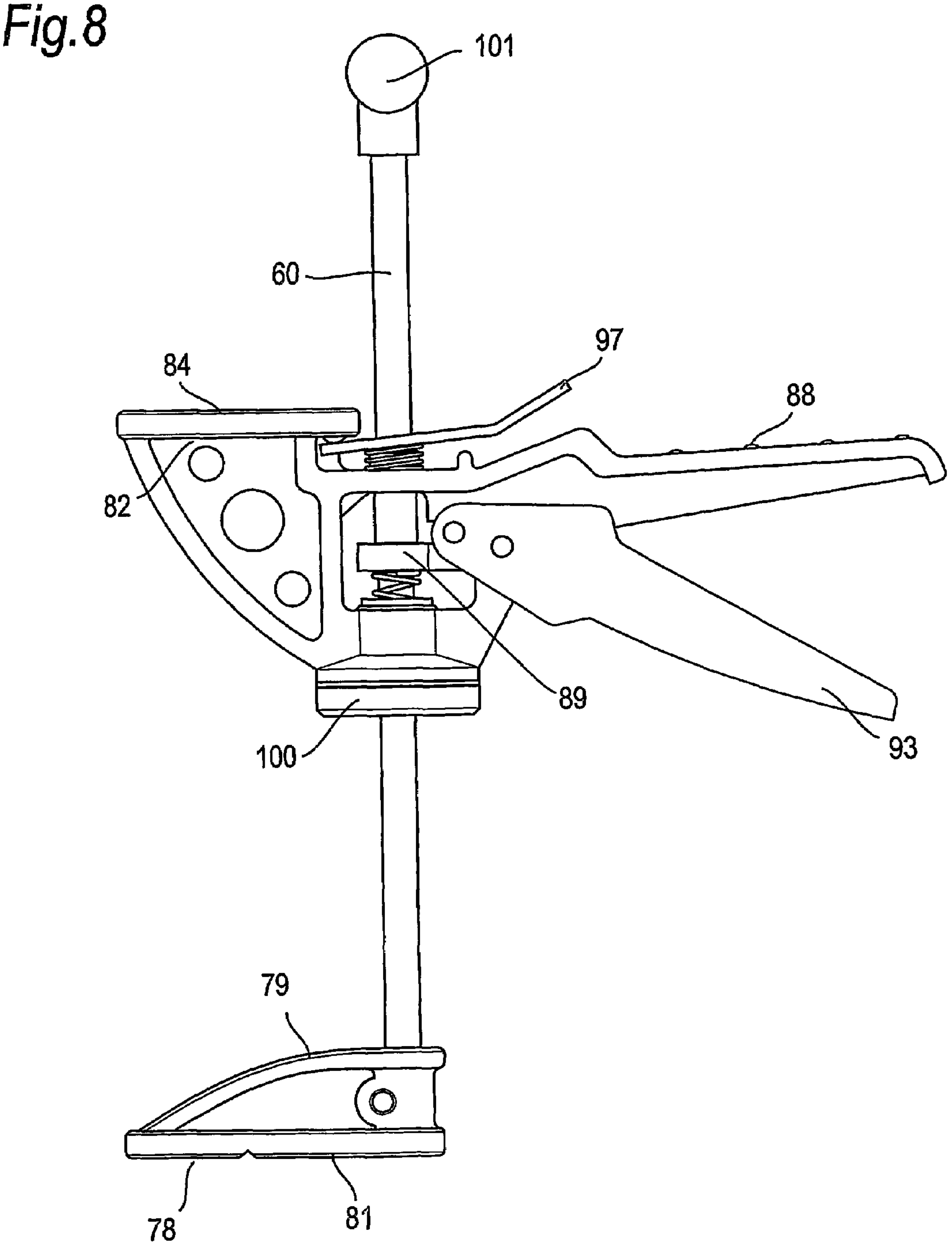
FIG. 8 illustrates the embodiment of FIG. 7 when the jaws are arranged so that when in operation they move apart.

When the lever 93 is in the position shown by the dashed lines of FIG. 5 the spring 90 is relaxed i.e., in its non-compressed state. This is illustrated in FIGS. 7 and 8 The plate 89 is in a raised generally horizontal setting relative to the rod 60.

A second compression spring 95 is provided on the rod this second spring at one end rests upon the upper web 85 as indicated in the FIG. 5 whilst the other end of the second spring co-operates with the adjacent surface 96 of a lever 97 extending in the same direction as the handle. 88 The lever 97 has a through bore that is an easy fit with respect to the rod 60. The lever 97 can be regarded as forming a so-called clutch plate the function of which will be discussed hereinafter.

One end 98 of the lever 97 is forked and the limbs of the fork engage with abutments 99 provided on the main body bracket 83 associated with the clamping plate 82. The abutments 99 are so positioned that the action of the second spring 95 tilts the lever 97 to the setting shown in the FIG. 5. When in this position the lever 97 is effectively set to a rest position in which it locks with the rod 60 sufficiently to resist movement of the main body 67 in the direction that separates the clamping plates 78, 82. When the lever 97 is depressed against the action of the second spring 95 the locking effect is released allowing free movement of the main body 67 and the lever 97 relative to the rod 60 and thus the separation of the clamping plates.

In addition, movement of the main body 67 towards the clamping/cramping plate 78 has the effect of releasing the locking effect of the lever 97

It will be understood from the forgoing that the above clamping apparatus is hand operated by squeezing the lever 93 towards the bracket 88 that is moved to the full line position shown in the FIG. 5 in so doing the lever pivots about its fulcrum. This movement presses the nose 92 thereof against the catch plate 89 causing the latter to tilt sufficiently to jam against the rod. and produce relative movement between the rod and the main body 67. This has the effect of pushing the rod 60 through the body 67 to reduce the distance between the body and thus the clamping plate 82 carried by the main body bracket 83 the top clamp 81. During this relative movement between the bracket 67 and the rod 60, friction between the clutch plate 97 and the rod 60 overcomes the action of the spring 95 and allows the clutch plate to free itself from gripping contact against the rod 60 and to seat itself against the abutments 99 on the main body bracket 83, thus allowing the rod 60 to slide through the hole in the clutch plate 97.

When the load applied by the hand to the lever 88 is released the spring 90 un-tilts the catch plate 89. This action frees the catch plate 89 relative to the rod 60 allowing the plate 89 to slide along the rod and to thus return the lever 93 to return to its initial position and the plate 89 to contact the bottom of the top guide.

Meanwhile the spring 95 pushes the clutch plate 97 to press against the abutments 99 on the bracket 89 of the main body 67 the plate 97 then tilts and jams against the rod 60 thus holding the main body 67 in its new position on the rod.

As the user continues to 'pump' squeeze the lever 88 the main body 67 is advanced along the rod 60 until an item (not shown) to be clamped is gripped between the top clamp plate 81 and the clamp platform 82 of the main body.

To release the clamping load press the end of the clutch plate 97 down towards the main body compressing the small spring 95 and freeing the clutch plate 97 from the rod 60.

To retract the clamp assembly the main body is moved downwards whilst continuing to keep the clutch plate pressed down.

The clamp unit can be modified so as to provide an independent or standalone unit.

One such modification is illustrated in FIGS. 7 and 3. The general construction of the unit shown in these Figures is similar to that so far discussed in relation, particularly to FIGS. 5 and 6 whereby the same reference numerals will be used for corresponding components.

As is the case with the FIG. 5 arrangement the clamp 79 is mounted to one end of the support rod 60.

The other clamp unit 67 is modified in that the coupling 62 as previously discussed is replaced by a modified component 100 having an internal bore that is a smooth sliding fit with respect to to bar 60.

With this arrangement smooth relative movements are possible between the clamp member 67 without rock or unnecessary relative tilt.

The end of the bar 60 that in the FIGS. 5 and 6 embodiment entered into the hollow leg is provided with a stop part 101 which is readily removable for reasons to be mentioned and which serves to prevent the clamp from disengaging from the bar.

With the provision of this removable stop part 10 it is possible to position the clamp so that the clamp surfaces 81 and 84 face towards each other as shown in FIG. 7. This is the arrangement as shown in FIGS. 5 and 6. With this arrangement operating the manual operating mechanism moves to clamping surfaces towards each other to effect a clamping/cramping action.

Alternatively the stop part 101 is removed and the clamp removed from the bar 60 and then inverted and replaced as shown in FIG. 8 so that the clamping surface 84 faces outwardly.

At the same time the other clamp unit 79 is removed from the bar 60, reversed and refitted so that its associated clamping surface 81 also faces outwards to produce the arrangement as shown in FIG. 8.

It will be appreciated that the clamping unit 26 can be used with an orientation as shown in FIG. 7 or as shown in FIG. 8 according to convenience of use.

With this arrangement of FIG. 8 operation of the manual operating mechanism moves the clamping surfaces 81 and 84 away from each other. When in this configuration such mechanism operation exerts outwards spreading forces a work piece with which the clamping surfaces 81 and 84 co-operate.

It will be appreciated that the maximum separation of the clamping surfaces in each case is effectively determined by the length of the bar/rod 60 and is such that the longer the bar the greater the maximum separation of the clamping surfaces 81 and 84.

Figure 9:
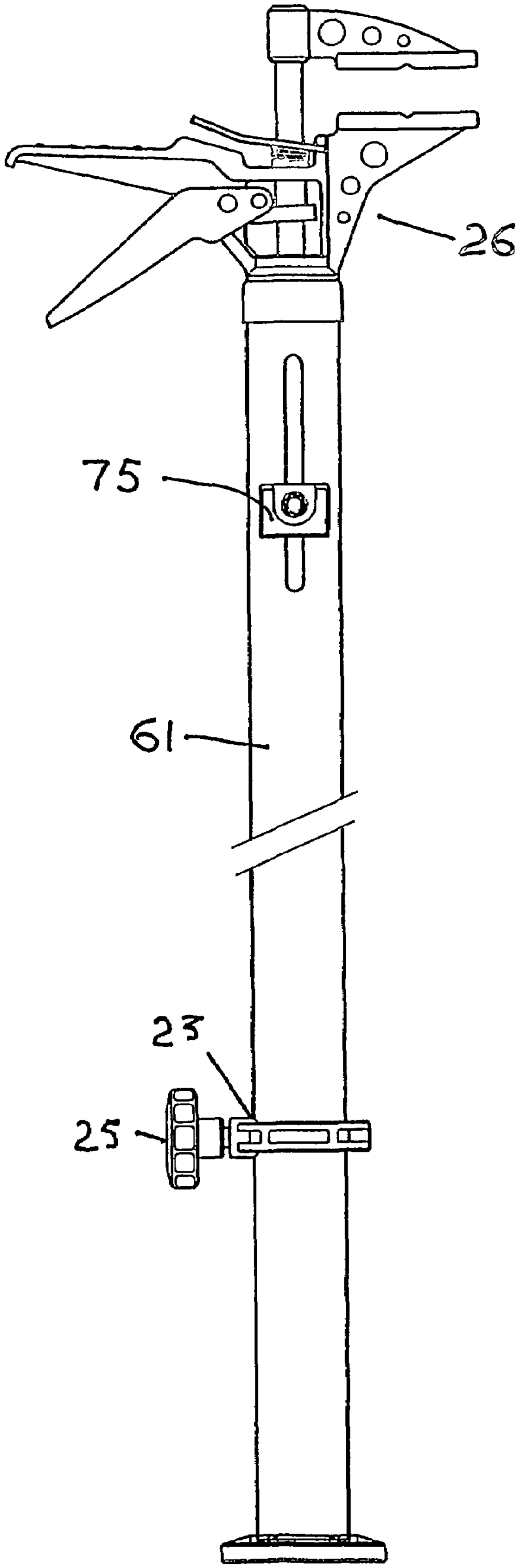
FIG. 9 illustrates an embodiment of an application of the clamping arrangements of previous Figures when mounted to an elongate tube to be usable as a sash cramp.

Referring now to FIG. 9, this Figure illustrates an embodiment of the above discussed clamping arrangements providing a sash cramp facility.

Since the components involved have been previously mentioned and identified by reference numerals the corresponding components of the embodiment of FIG. 9 will be identified by the same reference numerals.

As is shown a clamp unit 26 is mounted as previously discussed to the upper end of a tubular member 61.

For the purposes of acting as a sash cramp the the thrust block 75 serves as one of the clamping plates/surfaces of the sash cramp.

The ring member 23 with its associated locking head 25 serves as the other clamping surface of the sash cramp.

It will be appreciated that whenever a requirement for use as a sash clamp is envisaged the ring member 23 will be provided with an acceptable area of clamping surface.

To use as a sash cramp the ring member is position along the tube 61 at an appropriate separation from the thrust block 75. In practice, when sash cramps are being used it is generally necessary to pre-set the separation between the cramping surfaces so that the associated cramping unit has a sufficient cramping range in relation to the size of a work piece to be cramped. In the present case the locking head is loosened and the ring member moved lengthways of the tube 61 to an acceptable setting and the locking head tightened to firmly clamp the ring member in its set position.

After this the work piece (not shown) is introduced between the thrust block 75 and the ring member 23 and the clamp unit 26 operated to move the thrust member towards the ring member 23 and in so doing exert cramping forces upon the work piece.

After the required claiming action the clamp unit would be released in the manner as discussed above.

Figure 10:
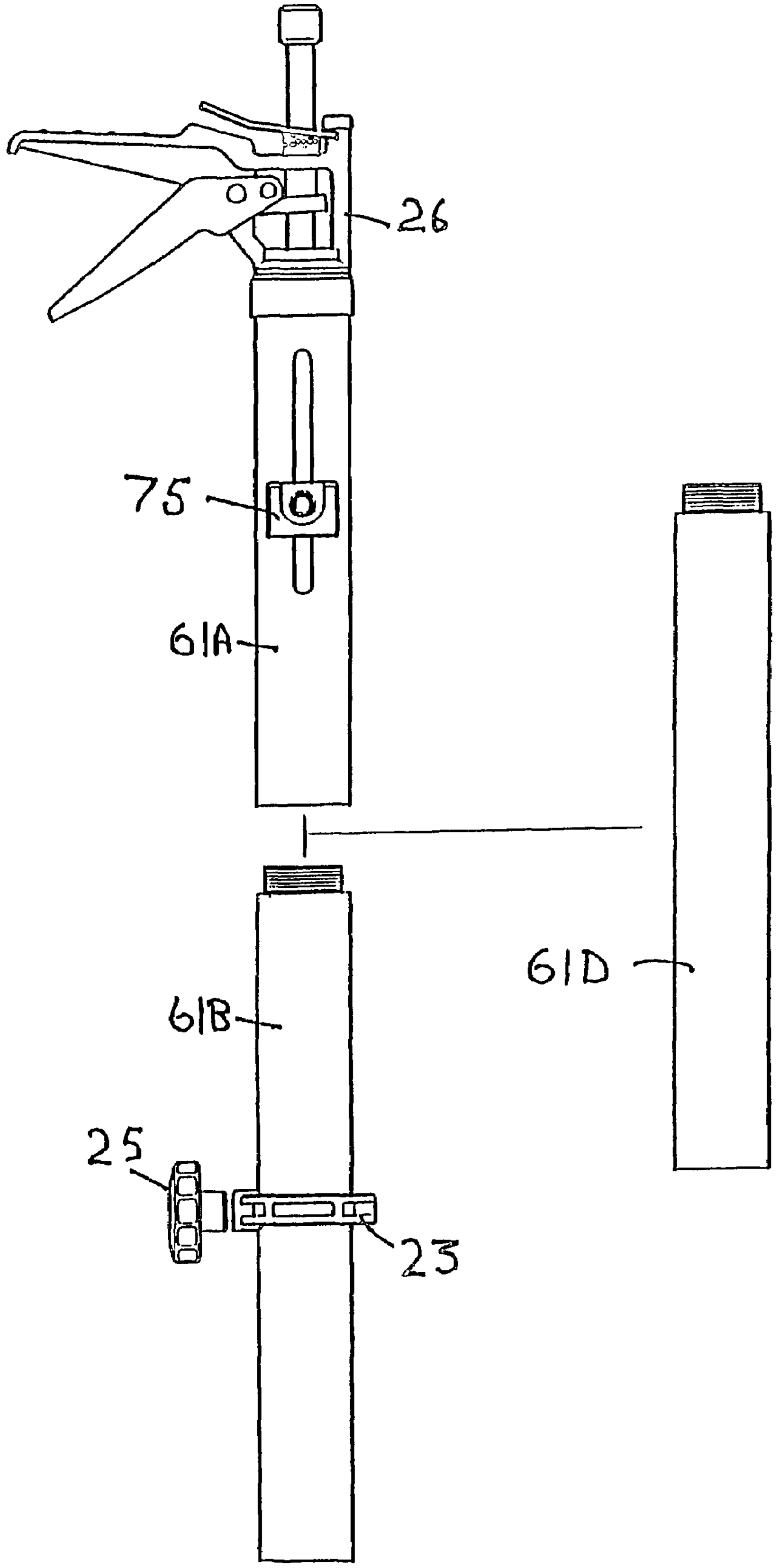
FIG. 10 illustrates an embodiment of a sash clamp that is lengthways extensible by the addition of length producing tubular extensions.

Since the purpose of sash clamps is to be able to accommodate lengthy work pieces sash clamps are available in ranges of differing clamping lengths. FIG. 10 schematically illustrates a means whereby the sash cramp of FIG. 9 can be changed in length. As is indicated the tube 61 is separated into upper and lower parts 61A and 61B and the adjacent ends of the two parts are suitably threaded as at 61C to receive insert pieces 61D whose ends are correspondingly threaded.

By providing a range of different lengths for the insert pieces 61D a corresponding range of sash clamps is produced.

The invention claimed is:

1. A foldable work piece support assembly comprising:

two similar frames pivotally interconnected to each other, each frame incorporating two leg members, upper and lower connecting members connected to frames for maintaining the frames in pre-selectable spaced relationships, the connecting members being lengthwise telescopically extendable and pivotally connected to the frames so that the connecting members are movable between a generally cruciform position permitting use of the assembly as a work piece support and foldable to lie one against the other during stowage and transportation, and at least one rapid locking and quick release article retaining means mounted to a leg member of at least one of the frames, the article retaining means including first and second clamp members, an elongate thrust member supporting the second clamp member for movement in a predetermined direction with respect to the first clamp member to permit variation in separation distance between the clamp members, a manually operable unidirectional drive means for producing relative movement between the first and second clamp members to produce a required relative clamping displacement between the first and second clamp members, including a tiltable element engaged by the thrust member so as to be tiltable relative to said predetermined direction, the tiltable element being arranged for positioning between a thrust member engaging position and a released position relative to the thrust member, spring means urging the tiltable element into said released position, and a manually operable member co-operating with the tiltable element for alternately positioning the tiltable element into the engaging position to cause the thrust member to move by a predetermined extent in said clamping direction and to said released position in which the tiltable element returns to its initial position;

a lock for selectively preventing movement of the thrust member, and a lock release for permitting movement of the thrust member, thereby enabling rapid locking and quick release of a work piece required to be supported by the foldable support assembly.

2. A rapid locking and quick release article retaining means comprising:

first and second clamp members, an elongate thrust member supporting the second clamp member for movement in a predetermined direction with respect to the first clamp member to permit variation in separation distance between the clamp members, a manually operable unidirectional drive means for producing relative movement between the first and second clamp members to produce a required relative clamping displacement between the first and second clamp members, including a tiltable element engaged by the thrust member so as to be tiltable relative to said predetermined direction, the tiltable element being arranged for positioning between a thrust member engaging position and a released position relative to the thrust member, spring means urging the tiltable element into said released position, and a manually operable member co-operating with the tiltable element for alternately positioning the tiltable element into the engaging position to cause the thrust member to move by a predetermined extent in said clamping direction and to said released position in which the tiltable element returns to its initial position;

a lock for selectively preventing movement of the thrust member, and a lock release for permitting movement of the thrust member.

3. Apparatus as claimed in claim 1 or 2 further comprising a second tiltable element resiliently biased toward a position in which the tiltable element prevents reverse movement of the thrust member.

4. Apparatus as claimed in claim 3 further comprising a manually operated lever connected to the second tiltable element for moving the second tiltable element to its release position allowing said reverse movement of the thrust member.

5. Apparatus as claimed in claim 3 further comprising a handle arrangement including a manually operable lever operationally connected with said second tiltable element, the lever being pivotable between an actuated position in which the second tiltable element is moved against a second spring means to an operated position and a rest position in which the second tiltable element returns to a released position.

6. Apparatus as claimed in either claim 1 or 2 further comprising clamping surfaces selectively engagable with the first and second clamp members so that the clamping surfaces face toward each other or face away from each other.

7. Apparatus as claimed in claim 6 wherein the clamp members are rotatable relative to each other.

8. Apparatus as claimed in claim 1 or claim 2 further comprising a handle arrangement including a manually operable lever operationally connected with said tiltable element, the lever being pivotable between an actuated position in which the tiltable element is moved against said spring means to an operated position and a rest position in which the tiltable element returns to a released position.

9. Apparatus as claimed in claim 1 or claim 2 further comprising an elongate support whose longitudinal axis coincides with said predetermined direction, the elongate support having a bore engaged by said thrust member in such manner as to allow relative displacement between the first clamp member and the elongate support.

10. Apparatus as claimed in claim 9, further comprising an elongate slot provided in the elongate support, the slot extending over the range of displacement of the thrust member within the elongate support, and a thrust element engaging with the outer surface of the elongate support that is coupled to an end region of the portion of the thrust member engaging in the elongate support.

11. Apparatus as claimed in claim 9, further comprising an axially displaceable member coupled to the elongate support, the axially displaceable member adapted to provide a further clamping element, which in conjunction with said thrust element, converts the article retaining means to a sash form of cramping means for a work piece.

12. Apparatus as claimed in claim 9, wherein the elongate support is adapted for receiving extensions whereby the overall length of the elongate support can be selectively varied.

13. Apparatus as claimed in claim 1, wherein a leg of the foldable support assembly comprises an elongate support.

14. Apparatus as claimed claim 13, each of said two similar pivotally interconnected frames incorporate two leg members maintained in a pre-selectable spaced relationship by at least one connecting member, and said first clamp member is adapted for releasable connection to an upper end of one of the legs.

15. A foldable work piece support assembly comprising:

two similar frames pivotally interconnected to each other, each frame incorporating two leg members, upper and lower connecting members connected to frames for maintaining the frames in pre-selectable spaced relationships, the connecting members being lengthwise telescopically extendable and pivotally connected to the frames so that the connecting members are movable between a generally cruciform position permitting use of the assembly as a work piece support and foldable to lie one against the other during stowage and transportation, and at least one rapid locking and quick release article retaining means mounted to a leg member of at least one of the frames, the article retaining means including first and second clamp members, an elongate thrust member supporting the second clamp member for movement in a predetermined direction with respect to the first clamp member to permit variation in separation distance between the clamp members, a manually operable unidirectional drive means for producing relative movement between the first and second clamp members to produce a required relative clamping displacement between the first and second clamp members, a lock for selectively preventing movement of the thrust member, and a lock release for permitting movement of the thrust member, thereby enabling rapid locking and quick release of a work piece required to be supported by the foldable support assembly an elongate support whose longitudinal axis coincides with said predetermined direction, the elongate support having a bore engaged by said thrust member in such manner as to allow relative displacement between the first clamp member and the elongate support, an elongate slot provided in the elongate support, the slot extending over the range of displacement of the thrust member within the elongate support, and a thrust element engaging with the outer surface of the elongate support that is coupled to an end region of the portion of the thrust member engaging in the elongate support.

16. A rapid locking and quick release article retaining means comprising:

first and second clamp members, an elongate thrust member supporting the second clamp member for movement in a predetermined direction with respect to the first clamp member to permit variation in separation distance between the clamp members, a manually operable unidirectional drive means for producing relative movement between the first and second clamp members to produce a required relative clamping displacement between the first and second clamp members, a lock for selectively preventing movement of the thrust member, a lock release for permitting movement of the thrust member, an elongate support whose longitudinal axis coincides with said predetermined direction, the elongate support having a bore engaged by said thrust member in such manner as to allow relative displacement between the first clamp member and the elongate support, an elongate slot provided in the elongate support, the slot extending over the range of displacement of the thrust member within the elongate support, and a thrust element engaging with the outer surface of the elongate support that is coupled to an end region of the portion of the thrust member engaging in the elongate support.

17. Apparatus as claimed in claim 15 or claim 16, further comprising an axially displaceable member coupled to the elongate support, the axially displaceable member adapted to provide a further clamping element, which in conjunction with said thrust element, converts the article retaining means to a sash form of cram ping means for a work piece.

18. Apparatus as claimed in claim 15 or claim 16, wherein the elongate support is adapted for receiving extensions whereby the overall length of the elongate support can be selectively varied.

* * * * *

UNITED STATES PATENT AND TRADEMARK OFFICE

CERTIFICATE OF CORRECTION

PATENT NO. : 7,377,504 B2
APPLICATION NO. : 10/547979
DATED : May 27, 2008
INVENTOR(S) : Mik Houldsworth It is certified that error appears in the above-identified patent and that said Letters Patent is hereby corrected as shown below:

Column 14
Line 27, delete the word "cram ping" and insert -- cramping --.

Signed and Sealed this

Twelfth Day of August, 2008

JON W. DUDAS
*Director of the United States Patent and Trademark Office*